UNITED STATES PATENT OFFICE.

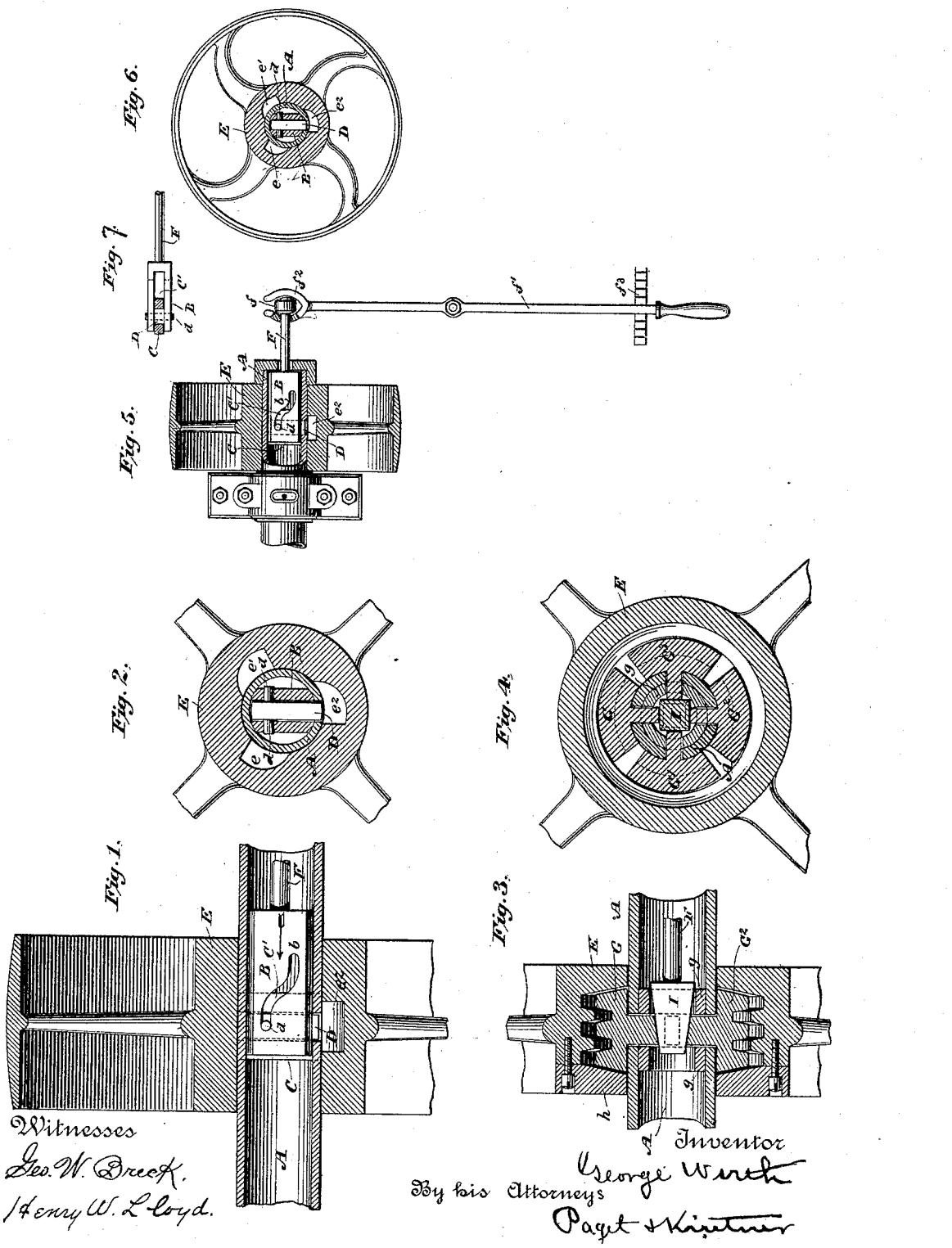

GEORGE WIRTH, OF GRATZ, AUSTRIA-HUNGARY.

CLUTCH.

SPECIFICATION forming part of Letters Patent No. 440,679, dated November 18, 1890.

Application filed January 10, 1890. Serial No. 336,532. (No model.)

*To all whom it may concern:*

Be it known that I, GEORGE WIRTH, a subject of the Emperor of Austria-Hungary, residing at Gratz, in Austria-Hungary, have made a new and useful invention in Clutch Mechanism for use in the Transmission of Power, of which the following is a specification.

My invention relates particularly to improvements in clutch mechanism for connecting rotating shafting to pulleys or similar power-transmitting devices at will, and its objects are, first, to make mechanical connection between the shafting and pulleys simple and effective, so that it may be made at the will of an attendant, and that there will be no danger of any such connection being accidentally made or disturbed; second, to devise a clutch-connection which will connect a pulley and a rotating shaft, or vice versa, when one of such parts is in motion without giving an undue shock to the stationary part. I accomplish these objects by the mechanism hereinafter described, but particularly pointed out in the claims which follow this specification.

My invention will be fully understood by referring to the accompanying drawings, in which—

Figure 1 is a longitudinal sectional view showing a shaft with a pulley and one form of my improved clutch mechanism. Fig. 2 is a sectional view taken at right angles to that shown in Fig. 1. Fig. 3 is a longitudinal sectional view of a modified form of my invention. Fig. 4 is a cross-sectional view of this modified form. Fig. 5 is a diminished longitudinal sectional view substantially the same as Fig. 1, but showing the additional feature of an operating-lever for manipulating the clutch. Fig. 6 is a sectional view of a pulley with this form of clutch mechanism. Fig. 7 is a detail view of one operating-rod and the connections between it and the clutch mechanism.

Referring to the drawings in detail, in all of which like letters represent like parts wherever used, A is a hollow rotary shaft connected to some source of power not shown.

E is a pulley, cog-gear, or analogous means of transmitting power from a rotary shaft.

B is a forked block fitting in the interior of the hollow shaft A and adapted to slide longitudinally therein through the agency of a push-rod F, connected to its solid end.

$b\ b$ are curvilinear slots in the opposite branches of the forked block.

D is a sliding connecting-block fitting snugly between the two branches of the forked lever B and held in place between said branches by a metallic pin $d$, which is adapted to slide in the curvilinear slots $b\ b$ and held from motion in either direction in the shaft A by the metallic guides C C'.

$e\ e'\ e^2$ are clutch-notches on the interior of that portion of the pulley which bears upon the shaft A, adapted to receive the block D as it is thrust outward through the operation of push-rod F on the supposition that shaft A is rotating from left to right, as seen looking at Figs. 2 and 6.

$f'$ is an operating rod or lever, having a fork-bearing $f^2$ adapted to act upon the head $f$ of the push-rod F, and $f^3$ is a rack adapted to hold said operating-lever in any desired position.

I will now describe the operation of this form of my invention. Supposing the shaft A, Figs. 2 and 6, to be rotating in the direction of the hands of a watch, the block D being in its interior or retracted position, no motion is imparted to the pulley E. Upon taking hold of the handle of lever $f'$ and pulling it to the right to its full limit the forked block B, through its curvilinear grooves $b\ b$, imparts to the clutch-block D an outward motion or thrust, thereby causing said block to come into operative connection with the angular face of some one of the clutch-notches $e\ e'$ $e^2$, whereupon the pulley E is immediately set in motion. The lever $f'$ being locked by the rack $f^3$, there is no possibility of any disconnection between the shaft A and the pulley E; nor could said disconnection occur, even though this arm be not locked, inasmuch as an end-thrust of the rod is always required to either connect or disconnect the parts referred to.

I will now describe the modified form of my invention shown in Figs. 3 and 4.

In the form of my invention already described, owing to the instantaneous method of connecting the shaft and pulley, there may arise a sudden shock, which under certain circumstances is objectionable. This objectionable feature is overcome in the modified form disclosed in Figs. 3 and 4. As before, A is the shaft, and E the pulley. $G\ G'\ G^2\ G^3$ are four clutch-blocks extending through four openings in the shaft, said clutch-blocks being adapted to slide from the center of the shaft outward and back and having wedge-shaped grooves on their outer faces, which are adapted to fit in corresponding grooves on the inner face of the pulley, the arrangement being such that when the clutch-blocks are at their extreme inner position there is no mechanical connection between them and the pulley, as shown in Fig. 3. $h$ is a disk forming a detachable portion of the pulley held in place by screws, as shown in Fig. 3. These screws may be removed and the pulley slipped off the shaft when desired. I is a four-sided wedge-shaped block connected to push-rod F and adapted to bear against the inner faces of the clutch-blocks G, so that as said push-rod is forced from right to left in Fig. 3 the clutch-blocks will be caused to bear frictionally against the pulleys E, and thereby impart motion to it from the shaft A. The operation of this modified form is entirely obvious and needs no further description here.

Having thus described my invention, what I claim, and desire to secure by Letters Patent of the United States, is—

1. A hollow shaft carrying a loose pulley, in combination with a series of peripherally-grooved clutch-blocks projecting from within the shaft and adapted to bear frictionally against the pulley, substantially as described.

2. A hollow shaft carrying a loose pulley, in combination with a radially-movable clutch member located at least partially within said shaft and adapted to connect the shaft to the pulley and a manipulating-rod located inside said shaft and having mechanical connection with a shipping lever outside the shaft, and with a rack adapted to hold said shipping-lever in any desired position, substantially as described.

GEORGE WIRTH.

Witnesses:
 ALBERT ZAMARINN,
 AUG. DIETRICH.